(12) United States Patent
Cai et al.

(10) Patent No.: US 11,297,600 B2
(45) Date of Patent: Apr. 5, 2022

(54) RESOURCE SELECTION METHOD AND APPARATUS

(71) Applicant: Huawei Technologies Co., Ltd., Shenzhen (CN)

(72) Inventors: Yu Cai, Beijing (CN); Yongbo Zeng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 16/334,685

(22) PCT Filed: Sep. 30, 2016

(86) PCT No.: PCT/CN2016/101380
§ 371 (c)(1),
(2) Date: Mar. 19, 2019

(87) PCT Pub. No.: WO2018/058676
PCT Pub. Date: Apr. 5, 2018

(65) Prior Publication Data
US 2020/0329457 A1    Oct. 15, 2020

(51) Int. Cl.
*H04W 72/08* (2009.01)
*H04W 72/02* (2009.01)
(Continued)

(52) U.S. Cl.
CPC .......... *H04W 72/02* (2013.01); *H04W 4/40* (2018.02); *H04W 72/082* (2013.01); *H04W 76/14* (2018.02); *H04W 92/18* (2013.01)

(58) Field of Classification Search
CPC ....... H04W 72/02; H04W 76/14; H04W 4/40; H04W 72/082; H04W 92/18
See application file for complete search history.

(56) References Cited

U.S. PATENT DOCUMENTS

| 2007/0105574 A1* | 5/2007 | Gupta | ............... | H04W 72/0406 455/509 |
| 2016/0037530 A1* | 2/2016 | Peng | .................... | H04B 17/382 370/329 |

(Continued)

FOREIGN PATENT DOCUMENTS

| CN | 105474726 A | 4/2016 |
| CN | 105940744 A | 9/2016 |

(Continued)

*Primary Examiner* — Joseph E Dean, Jr.
(74) *Attorney, Agent, or Firm* — Slater Matsil, LLP

(57) ABSTRACT

Embodiments of the present invention provide a resource selection method, including: determining, by a first terminal, at least one of second parameter information of a second terminal and configuration information; and determining, by the first terminal, a target threshold based on at least one of the configuration information, the second parameter information, and first parameter information of the first terminal, where the target threshold is used by the first terminal to perform resource selection. The embodiments of the present invention further provide a resource selection apparatus. In the present invention, a resource is selected by changing a target threshold based on different parameters. In this way, a signal-to-interference ratio is increased, an error rate is reduced, and a demodulation performance is improved.

20 Claims, 4 Drawing Sheets

(51) Int. Cl.
*H04W 76/14* (2018.01)
*H04W 4/40* (2018.01)
H04W 92/18 (2009.01)

(56) References Cited

U.S. PATENT DOCUMENTS

| | | | |
|---|---|---|---|
| 2016/0112962 | A1 | 4/2016 | Park |
| 2016/0183167 | A1 | 6/2016 | Agiwal et al. |
| 2016/0183281 | A1* | 6/2016 | Yeh ..................... H04J 3/0614 370/332 |
| 2016/0353450 | A1* | 12/2016 | Miao .................... H04W 92/20 |
| 2017/0013598 | A1 | 1/2017 | Jung et al. |
| 2017/0230918 | A1 | 8/2017 | Ryu et al. |
| 2019/0053198 | A1 | 2/2019 | Jung et al. |

FOREIGN PATENT DOCUMENTS

| | | |
|---|---|---|
| EP | 3160201 A1 | 4/2017 |
| KR | 20160016489 A | 2/2016 |
| WO | 2015115872 A1 | 8/2015 |
| WO | 2015178851 A1 | 11/2015 |
| WO | 2015194916 A1 | 12/2015 |
| WO | 2016018009 A1 | 2/2016 |
| WO | 2016070607 A1 | 5/2016 |

\* cited by examiner (a)

(b)

RESOURCE SELECTION METHOD AND APPARATUS

CROSS-REFERENCE TO RELATED APPLICATIONS

This application is a national stage of International Application No. PCT/CN2016/101380, filed on Sep. 30, 2016, which is hereby incorporated by reference in its entirety.

TECHNICAL FIELD

The present invention relates to the field of wireless network technologies, and in particular, to a resource selection method and apparatus.

BACKGROUND

Cellular network-based D2D (Device-to-Device, device-to-device) communication is a technology allowing, under control of a system, direct communication between terminals by multiplexing a cell resource. Such a technology can increase a spectrum efficiency of a cellular communications system and reduce a transmit power for a terminal, thereby resolving, to some extent, a problem of a lack of spectrum resources in a wireless communications system.

To improve safety and intelligence of a transportation system, a concept of intelligent transportation system gradually emerges. Intelligent transportation can use a new generation of communications networks and data processing capabilities to improve an overall efficiency of a transportation system, reduce energy consumption, and increase transportation safety and convenience. A V2X (Vehicle to Everything, Internet of Vehicles) technology allows one vehicle to continuously communicate with all other nearby vehicles and road infrastructure, for example, allows the vehicle to communicate with infrastructure such as traffic lights, school regions and railway crossings. A communications device may be a mobile device such as an in-vehicle embedded remote information processing system or a smartphone. The V2X technology achieves communication between vehicles, communication between a vehicle and a base station, and communication between base stations, to obtain transportation information such as a real-time road condition, road information and pedestrian information, thereby increasing driving safety, alleviating congestion, improving a transportation efficiency, providing in-vehicle entertainment information, and the like.

The V2X communication can be implemented based on the D2D technology, so that each in-vehicle unit can directly communicate with an in-vehicle unit of another nearby vehicle. Because in the V2X communication, forwarding performed by a base station or a roadside unit is not required, a delay of communication between vehicles can be significantly reduced and a transmission rate can be increased. In the D2D communication, data sent by UEs (User Equipment, user equipment) all carries SA (Scheduling Assignment, scheduling assignment) when vehicles are relatively close to each other. The SA may indicate information such as a resource in which the data is located. In addition, service traffic of the UEs is periodic. For example, a shortest period of a CAM (Cooperative Awareness Message, cooperative awareness message) is 100 ms and a longest period is 1 s. The UEs are capable of predicting periods of traffic of the UEs. Therefore, a UE resource reservation solution is added to the V2X communication. On one hand, UE may inform another UE of a future resource reserved by the UE. On the other hand, when selecting a resource for sending data, the UE needs to consider a resource reserved by the another UE, to avoid, as much as possible, multiplexing the resource already reserved by the another UE.

V2V defines a solution in which UE performs monitoring and semi-static reservation transmission in an autonomous resource selection mode. In the autonomous resource selection mode of the UE, when resource selection or resource reselection is triggered, if to-be-sent data arrives at a time point m, the UE monitors a resource use condition at least during a time period [m−1000, m−1). The UE needs to first exclude a resource meeting a specific condition, and then select a resource from remaining resources for sending data. The condition for excluding a resource is: SA received by the UE has reserved the resource, and an RSRP (Reference Signal Receiving Power, reference signal received power) of a PSSCH (Physical Sidelink Shared Channel, physical sidelink shared channel), of the UE, on the resource associated with the SA, is greater than a threshold. The threshold is used to determine whether the resource can be multiplexed. If the PSSCH-RSRP is less than the threshold, the UE may select the resource to send data, that is, multiplex the resource reserved by another UE. If the PSSCH-RSRP is not less than the threshold, the UE and the another UE may be mutually interfered if the UE and the another UE use the resource at the same time, and therefore the UE cannot multiplex the resource.

In the prior art, UE usually uses, in various scenarios, a same threshold to determine a PSSCH-RSRP. Disadvantages of the prior art are described below by way of example.

In the D2D communication, if a network configures that UE uses open-loop power control, a transmit power of the UE dynamically changes. The transmit power of the UE is related to a link loss between the UE and a base station. A smaller link loss between the UE and the base station indicates a smaller transmit power. The open-loop power control mechanism is also used in the V2X communication. A receive power used by one UE to receive a signal sent by another UE may be expressed as: Pr=Pt+Gt−PL+Gr. Pr is the receive power, Pt is a transmit power, Gt is a transmit antenna gain, Gr is a receive antenna gain, and PL is a link loss between the two UEs. As shown in FIG. 1: (1) Assuming that a transmit power of UE A is greater than a transmit power of UE B, when the UE B transmits a signal, a receive power of the UE A is Pr(A), and when the UE A transmits a signal, a receive power of the UE B is Pr(B), Pr(A) is less than Pr(B); (2) when the UE B transmits a signal, a greater antenna gain of the UE B indicates a greater receive power of the UE A; (3) when the UE B transmits a signal, a greater antenna gain of the UE A indicates a greater receive power of the UE A.

As shown in FIG. 2, if the UE A finds, through monitoring, that a resource is indicated or reserved by the UE B, and a received PSSCH-RSRP is less than a threshold, the resource is not excluded and is likely to be selected by the UE A for sending data. It is assumed that the UE A selects the resource to send data. UE C receives a signal from the UE B on the resource, but receives interference from the UE A at the same time. Assuming that a transmit power or an antenna gain of the UE B in FIG. (a) is greater than a transmit power or an antenna gain of the UE B in FIG. (b), if the UE A uses a same threshold in the two cases, the UE A can still multiplex the resource reserved by the UE B when a distance from the UE A to the UE B in FIG. (b) is shorter than a distance from the UE A to the UE B in FIG. (a). However, for the UE C, a power received by the UE C from the UE B in FIG. (b) is less than a power received by the UE C from the UE B in FIG. (a), and a power received by the UE C from the UE A in FIG. (b) is greater than a power received by the UE C from the UE A in FIG. (a), that is, a usable signal from the UE B is weakened and interference from the UE A is strengthened. This leads to a reduced signal-to-interference ratio, an increased error rate and a decreased demodulation performance of the UE C.

As shown in FIG. 3, if the UE A finds, through monitoring, that a resource is indicated or reserved by the UE B, and a received PSSCH-RSRP is less than a threshold, the resource is not excluded and is likely to be selected by the UE A for sending data. It is assumed that the UE A selects the resource to send data. UE C receives a signal from the UE A on the resource, but receives interference from the UE B at the same time. Assuming that an antenna gain of the UE A in FIG. (a) is greater than an antenna gain of the UE A in FIG. (b), if the UE A uses a same threshold in the two cases, the UE A can still multiplex the resource reserved by the UE B when a distance from the UE B to the UE A in FIG. (b) is shorter than a distance from the UE B to the UE A in FIG. (a). However, for the UE C, a power received by the UE C from the UE A in FIG. (b) is less than a power received by the UE C from the UE A in FIG. (a), and a power received by the UE C from the UE B in FIG. (b) is greater than a power received by the UE C from the UE B in FIG. (a), that is, a usable signal from the UE A is weakened and interference from the UE B is strengthened. This leads to a reduced signal-to-interference ratio, an increased error rate and a decreased demodulation performance of the UE C.

As shown in FIG. 4, if the UE A finds, through monitoring, that a resource is indicated or reserved by the UE B, and a received PSSCH-RSRP is less than a threshold, the resource is not excluded and is likely to be selected by the UE A for sending data. It is assumed that the UE A selects the resource to send data. UE C receives a signal from the UE A on the resource, but receives interference from the UE B at the same time. Assuming that a transmit power of the UE A in FIG. (a) is greater than a transmit power of the UE A in FIG. (b), if the UE A uses a same threshold in the two cases, however, for the UE C, a power received by the UE C from the UE A in FIG. (b) is less than a power received by the UE C from the UE A in FIG. (a), that is, a usable signal from the UE A is weakened and interference from the UE B is unchanged. This leads to a reduced signal-to-interference ratio, an increased error rate and a decreased demodulation performance of the UE C.

SUMMARY

The present invention provides a resource selection method and apparatus, to resolve a technical problem in the prior art that a signal-to-interference ratio is reduced, an error rate is increased, and a demodulation performance is decreased because a same threshold is used.

According to a first aspect, this application provides a resource selection method. The method includes the following content:

First, a first terminal determines at least one of second parameter information of a second terminal and configuration information; and then, the first terminal determines a target threshold based on at least one of the configuration information, the second parameter information, and first parameter information of the first terminal, where the target threshold is used by the first terminal to perform resource selection. The second parameter information is used to determine at least one of a terminal type, a power value, location information, an antenna gain, and a link loss of the second terminal, and the first parameter information includes at least one of a terminal type, a power value, location information, an antenna gain, and a link loss of the first terminal. A resource is selected by changing a target threshold based on different parameters. In this way, a signal-to-interference ratio is increased, an error rate is reduced, and a demodulation performance is improved.

In a possible design, the configuration information is configured, preconfigured, or predefined by a network side device. The configuration information includes at least one threshold. The at least one threshold is a threshold of a signal power. The power value is a transmit power, or a product of the antenna gain and the transmit power, or a sum of the antenna gain and the transmit power when a unit of the antenna gain and that of the transmit power are dB or dBm.

In another possible design, the at least one threshold corresponds to a terminal type, the second parameter information is used to determine a terminal type of the second terminal, and the first parameter information includes a terminal type of the first terminal. A threshold corresponding to the terminal type of the first terminal is used as the target threshold; or a threshold corresponding to the terminal type of the second terminal is used as the target threshold; or a threshold corresponding to a target terminal type combination is used as the target threshold, where the target terminal type combination includes the terminal type of the first terminal and the terminal type of the second terminal. For example, the configuration information includes a threshold T1 and a threshold T2. When the terminal type of the first terminal is V-UE, the threshold T1 is selected. When the terminal type of the first terminal is P-UE, the threshold T2 is selected. For another example, the configuration information includes a threshold T1 and a threshold T2. When the terminal type of the second terminal is V-UE, the threshold T1 is selected. When the terminal type of the second terminal is P-UE, the threshold T2 is selected. For another example, the configuration information includes a threshold T1, a threshold T2, a threshold T3, and a threshold T4. When the terminal type of the first terminal is V-UE and the terminal type of the second terminal is V-UE, the threshold T1 is selected. When the terminal type of the first terminal is V-UE and the terminal type of the second terminal is P-UE, the threshold T2 is selected. When the terminal type of the first terminal is P-UE and the terminal type of the second terminal is V-UE, the threshold T3 is selected. When the terminal type of the first terminal is P-UE and the terminal type of the second terminal is P-UE, the threshold T4 is selected.

In another possible design, the at least one threshold corresponds to a terminal type, the second parameter information is used to determine a terminal type of the second terminal, and the first parameter information includes a terminal type of the first terminal. The target threshold is determined based on a threshold in the at least one threshold, a terminal type corresponding to the threshold, and the terminal type of the first terminal; or the target threshold is determined based on a threshold in the at least one threshold, a terminal type corresponding to the threshold, and the terminal type of the second terminal; or the target threshold is determined based on a threshold in the at least one threshold, a terminal type corresponding to the threshold, and a target terminal type combination, where the target terminal type combination includes the terminal type of the first terminal and the terminal type of the second terminal. For example, the configuration information includes a threshold T1. When the terminal type of the first terminal is V-UE, the threshold T1 is selected. When the terminal type of the first terminal is P-UE, a corresponding threshold is T2=T1+P2, where P2 is a parameter configured, preconfigured, or predefined by a network side device. For another example, the configuration information includes a threshold T1. When the terminal type of the second terminal is V-UE, the threshold T1 is selected. When the terminal type of the second terminal is P-UE, a corresponding threshold is T2=T1+P2[dbm], where P2 is a parameter configured, preconfigured, or predefined by a network side device. For another example, the configuration information includes a threshold T1. When the terminal type of the first terminal is V-UE and the terminal type of the second terminal is V-UE, the threshold T1 is selected. When the terminal type of the first terminal is V-UE and the terminal type of the second terminal is P-UE, a corresponding threshold is T2=T1+P2 [dbm], where P2 is a parameter configured, preconfigured, or predefined by a network side device. When the terminal type of the first terminal is P-UE and the terminal type of the second terminal is P-UE, a corresponding threshold is T2=T1+P3[dbm], where P3 is a parameter configured, preconfigured, or predefined by a network side device.

In another possible design, the at least one threshold corresponds to a power value, the second parameter information is used to determine a power value of the second terminal, and the first parameter information includes a power value of the first terminal. A threshold corresponding to the power value of the first terminal is used as the target threshold; or a threshold corresponding to the power value of the second terminal is used as the target threshold; or a threshold corresponding to a target power value combination is used as the target threshold, where the target power value combination includes the power value of the first terminal and the power value of the second terminal. For example, the configuration information includes a threshold T1 and a threshold T2. When the power value of the first terminal is Pa, the threshold T1 is selected. When the power value of the first terminal is Pb, the threshold T2 is selected. For another example, the configuration information includes a threshold T1 and a threshold T2. When the power value of the second terminal is Pa, the threshold T1 is selected. When the power value of the second terminal is Pb, the threshold T2 is selected. For another example, the configuration information includes a threshold T1 and a threshold T2. When the power value of the first terminal is Pa and the power value of the second terminal is Pa, the threshold T1 is selected. When the power value of the first terminal is Pa and the power value of the second terminal is Pb, the threshold T2 is selected.

In another possible design, the at least one threshold corresponds to a power value, the second parameter information is used to determine a power value of the second terminal, and the first parameter information includes a power value of the first terminal. The target threshold is determined based on a threshold in the at least one threshold, a power value corresponding to the threshold, and the power value of the first terminal; or the target threshold is determined based on a threshold in the at least one threshold, a power value corresponding to the threshold, and the power value of the second terminal; or the target threshold is determined based on a threshold in the at least one threshold, a power value corresponding to the threshold, and a target power value combination, where the target power value combination includes the power value of the first terminal and the power value of the second terminal. For example, the configuration information includes a threshold T1. When the power value of the first terminal is Pa, the threshold T1 is selected. When the power value of the first terminal is Pb, a corresponding threshold is T2=T1+P1, where P1 is a parameter configured, preconfigured, or predefined by a network side device. For another example, the configuration information includes a threshold T1. When the power value of the second terminal is Pa, the threshold T1 is selected. When the power value of the second terminal is Pb, a corresponding threshold is T2=T1+P1, where P1 is a parameter configured, preconfigured, or predefined by a network side device. For another example, the configuration information includes a threshold T1. When the power value of the first terminal is Pa and the power value of the second terminal is Pa, the threshold T1 is selected. When the power value of the first terminal is Pa and the power value of the second terminal is Pb, a corresponding threshold is T2=T1+P1, where P1 is a parameter configured, preconfigured, or predefined by a network side device.

In another possible design, when the second parameter information does not include a power value of the second terminal but includes a link loss or location information, the power value of the second terminal may be determined based on the link loss or the location information.

In another possible design, the at least one threshold corresponds to a link loss, the second parameter information is used to determine a link loss of the second terminal, and the first parameter information includes a link loss of the first terminal. A threshold corresponding to the link loss of the first terminal is used as the target threshold; or a threshold corresponding to the link loss of the second terminal is used as the target threshold; or a threshold corresponding to a target link loss combination is used as the target threshold, where the target link loss combination includes the link loss of the first terminal and the link loss of the second terminal.

In another possible design, the at least one threshold corresponds to a link loss, the second parameter information is used to determine a link loss of the second terminal, and the first parameter information includes a link loss of the first terminal. The target threshold is determined based on a threshold in the at least one threshold, a link loss corresponding to the threshold and the link loss of the first terminal; or the target threshold is determined based on a threshold in the at least one threshold, a link loss corresponding to the threshold, and the link loss of the second terminal; or the target threshold is determined based on a threshold in the at least one threshold, a link loss corresponding to the threshold, and a target link loss combination, where the target link loss combination includes the link loss of the first terminal and the link loss of the second terminal.

In another possible design, the at least one threshold corresponds to location information, the second parameter information is used to determine location information of the second terminal, and the first parameter information includes location information of the first terminal. A threshold corresponding to the location information of the first terminal is used as the target threshold; or a threshold corresponding to the location information of the second terminal is used as the target threshold; or a threshold corresponding to a target location information combination is used as the target threshold, where the target location information combination includes the location information of the first terminal and the location information of the second terminal.

In another possible design, the at least one threshold corresponds to location information, the second parameter information is used to determine location information of the second terminal, and the first parameter information includes location information of the first terminal. The target threshold is determined based on a threshold in the at least one threshold, location information corresponding to the threshold and the location information of the first terminal; or the target threshold is determined based on a threshold in the at least one threshold, location information corresponding to the threshold, and the location information of the second terminal; or the target threshold is determined based on a threshold in the at least one threshold, location information corresponding to the threshold, and a target location information combination, where the target location information combination includes the location information of the first terminal and the location information of the second terminal.

In another possible design, the target threshold is determined based on an attribute of a resource detected by the first terminal and the at least one threshold. Further, the at least one threshold corresponds to a resource attribute. A threshold corresponding to the attribute of the resource detected by the first terminal is used as the target threshold; or the target threshold is determined based on a threshold in the at least one threshold, a resource attribute corresponding to the threshold, and the attribute of the resource detected by the first terminal. For example, when an attribute 1 of the resource is that a terminal type 1 UE, a terminal type 2 UE, and a terminal type 3 UE may all transmit a resource, the terminal type 1 UE uses a threshold T1. When an attribute 2 of the resource is that the terminal type 1 UE and the terminal type 2 UE may both transmit a resource, the terminal type 1 UE uses a threshold T2. For another example, a network side device configures a threshold for each configured resource pool, so that the first terminal uses a corresponding threshold based on a resource pool to which the detected resource belongs. For example, it is configured that a threshold corresponding to a resource pool 1 is T1, and a threshold corresponding to a resource pool 2 is T2. When the resource detected by the first terminal belongs to the resource pool 1, the threshold T1 is used. When the resource detected by the first terminal belongs to the resource pool 2, the threshold T2 is used.

In another possible design, the target threshold is determined based on a congestion degree of a channel or a carrier and the at least one threshold. Further, the at least one threshold corresponds to a congestion degree. A threshold corresponding to the congestion degree of the channel or the carrier is used as the target threshold; or the target threshold is determined based on a threshold in the at least one threshold, a congestion degree corresponding to the threshold, and the congestion degree of the channel or the carrier. For example, a network configures a threshold T1 and a threshold T2 that respectively correspond to a congestion degree L1 and a congestion degree L2, and the UE selects a corresponding threshold based on a congestion degree of a current channel or carrier. For another example, a network configures a threshold T1. When a congestion degree is L1, a threshold is T1[dbm]. When a congestion degree is Ln, a corresponding threshold is T1+Xn[dbm]. Further, a greater congestion degree indicates a smaller target threshold.

In another possible design, data transport blocks are distinguished by priorities, and a data transport block having a higher priority may preferentially use a resource. Therefore, in addition to determining the target threshold based on the factors in the foregoing embodiments, the first terminal may further determine the target threshold by also referring to a priority of a data transport block.

In another possible design, the second parameter information is used to determine at least one of a terminal type, a power value, location information, an antenna gain, and a link loss of the second terminal, and the first parameter information includes at least one of a terminal type, a power value, location information, an antenna gain, and a link loss of the first terminal. The at least one threshold corresponds to at least one of a terminal type, a power value, location information, an antenna gain, and a link loss. The target threshold is determined based on the second parameter information and/or the first parameter information, and the at least one threshold. For example, a network side device configures a threshold T1, a threshold T2, a threshold T3, and a threshold T4. When the terminal type of the first terminal is V-UE and the power value is Pa, it is determined that the threshold is T1. When the terminal type of the first terminal is P-UE and the power value is Pb, it is determined that the threshold is T2. When the terminal type of the first terminal is V-UE and the power value is Pb, it is determined that the threshold is T3. When the terminal type of the first terminal is P-UE and the power value is Pa, it is determined that the threshold is T4.

According to a second aspect, this application provides a resource selection apparatus. The resource multiplexing apparatus is configured to implement the method and function performed by the resource multiplexing apparatus according to the first aspect, and is implemented by hardware/software. The hardware/software of the resource selection apparatus includes a unit corresponding to the foregoing function.

According to a third aspect, this application provides a terminal, including: a processor, a memory, and a communications bus. The communications bus is configured to implement connection and communication between the processor and the memory. The processor executes a program stored in the memory to implement the steps of the resource selection method according to the first aspect.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
FIG. 1 is a schematic structural diagram of a terminal communication according to the prior art.
Figure 2:
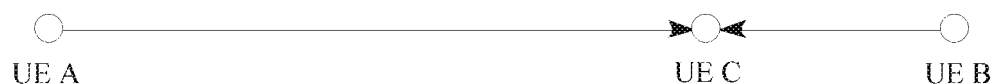
FIG. 2 is a first schematic diagram of signal interference of a terminal communication according to the prior art.
Figure 2:
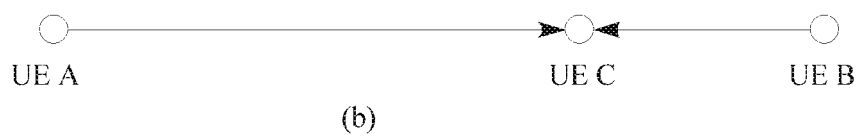
Figure 3:
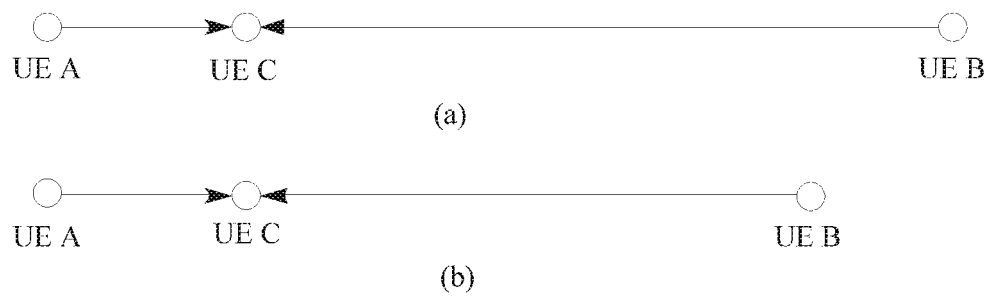
FIG. 3 is a second schematic diagram of signal interference of a terminal communication according to the prior art.
Figure 4:
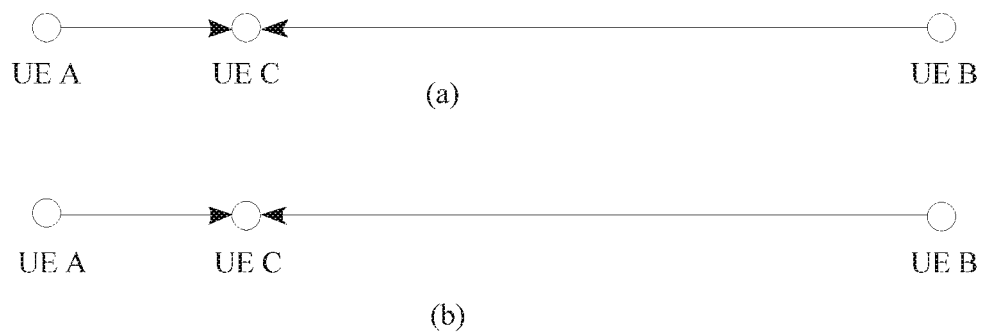
FIG. 4 is a third schematic diagram of signal interference of a terminal communication according to the prior art.
Figure 5:
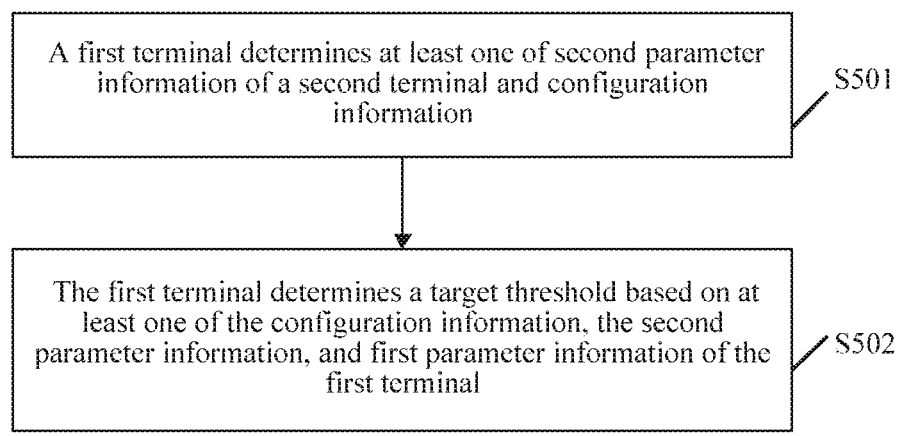
FIG. 5 is a schematic flowchart of a resource selection method according to an embodiment of the present invention.

FIG. 5 is a schematic flowchart of a resource selection method according to an embodiment of the present invention. As shown in the figure, the method in this embodiment of the present invention includes the following steps.

S501. A first terminal determines at least one of second parameter information of a second terminal and configuration information.

During specific implementation, the second parameter information is used to determine at least one of a terminal type, a power value, location information, an antenna gain, and a link loss of the second terminal, and the first parameter information includes at least one of a terminal type, a power value, location information, an antenna gain, and a link loss of the first terminal. The first terminal is UE selecting a resource, and the second terminal is UE reserving a resource. In V2X communication, the second terminal needs to inform another terminal that the second terminal reserves a future resource and sends the second parameter information to the another terminal. The first terminal, when selecting a resource, receives the second parameter information sent by the second terminal, so that the second parameter information of the second terminal is obtained. The configuration information is configured, preconfigured, or predefined by a network side device, and the configuration information includes at least one threshold.

S502. The first terminal determines a target threshold based on at least one of the configuration information, the second parameter information, and the first parameter information of the first terminal, where the target threshold is used by the first terminal to perform resource selection.

During specific implementation, the at least one threshold corresponds to a terminal type, the second parameter information is used to determine a terminal type of the second terminal, and the first parameter information includes a terminal type of the first terminal. A threshold corresponding to the terminal type of the first terminal may be used as the target threshold; or a threshold corresponding to the terminal type of the second terminal may be used as the target threshold; or a threshold corresponding to a target terminal type combination may be used as the target threshold, where the target terminal type combination includes the terminal type of the first terminal and the terminal type of the second terminal.

For example, if open-loop power control is not used, the transmit power and the antenna gain of each UE are fixed, and the network configures different thresholds for different terminal types or different terminal type combinations. The UE selecting a resource selects a corresponding threshold based on a type of the UE and/or a type of the UE reserving a resource. For example, when the UE selecting a resource is V-UE, a corresponding threshold is T1. When the UE selecting a resource is P-UE, a corresponding threshold is T2, and the rest can be deduced by analogy. Alternatively, when the UE reserving a resource is V-UE, a corresponding threshold is T1. When the UE reserving a resource is P-UE, a corresponding threshold is T2, and the rest can be deduced by analogy. Alternatively, when the UE selecting a resource is V-UE and the UE reserving a resource is V-UE, a corresponding threshold is T1. When the UE selecting a resource is V-UE and the UE reserving a resource is P-UE, a corresponding threshold is T2. When the UE selecting a resource is P-UE and the UE reserving a resource is P-UE, a corresponding threshold is T3, and the rest can be deduced by analogy. V-UE is vehicle (vehicle)-type UE, and P-UE is pedestrian (pedestrian)-type UE.

Optionally, the at least one threshold corresponds to a terminal type, the second parameter information is used to determine a terminal type of the second terminal, and the first parameter information includes a terminal type of the first terminal. The target threshold may be determined based on a threshold in the at least one threshold, a power value corresponding to the threshold, and the power value of the first terminal; or the target threshold may be determined based on a threshold in the at least one threshold, a power value corresponding to the threshold, and the power value of the second terminal; or the target threshold may be determined based on a threshold in the at least one threshold, a power value corresponding to the threshold, and a target power value combination, where the target power value combination includes the power value of the first terminal and the power value of the second terminal.

For example, the configuration information includes a threshold T1, and a combination corresponding to the threshold T1 is that the UE selecting a resource is V-UE and the UE reserving a resource is V-UE, or that the UE selecting a resource is V-UE and the UE reserving a resource is P-UE, or another type of combination. The configuration information does not include a corresponding threshold, but the network configures a relationship between a threshold corresponding to another terminal type and the threshold T1. The threshold corresponding to the another terminal type may be calculated based on the threshold T1 and the relationship between the threshold corresponding to the another terminal type and the threshold T1. It is assumed that the threshold T1 is the threshold corresponding to the target terminal type combination, and Tn is a to-be-determined threshold corresponding to the another terminal type. The network configures that when the UE selecting a resource is V-UE and the UE reserving a resource is V-UE, a corresponding threshold is T1; when the UE selecting a resource is V-UE and the UE reserving a resource is P-UE, a corresponding threshold is T2=T1+P2[dbm]; when the UE selecting a resource is P-UE and the UE reserving a resource is P-UE, a corresponding threshold is T3=T1+P3[dbm]; when the UE selecting a resource is P-UE and the UE reserving a resource is V-UE, a corresponding threshold is T4=T+P4[dbm], where P2, P3, and P4 are parameters configured, preconfigured, or predefined by the network side.

For another example, assuming that the threshold T1 corresponds to that the UE selecting a resource is type 1 UE and the UE reserving a resource is type 2 UE, Tn=εn*T1+(αn*Ptx1+βn*Ptx2+γn*Ptx3+δn*Ptx4)+Pn[dbm], where Ptx1 is a transmit power of the type 1 UE, Ptx2 is a transmit power of the type 2 UE, Ptx3 is a transmit power of the UE selecting a resource, Ptx4 is a transmit power of the UE reserving a resource, and Pn, αn, βn, γn, δn, and εn are parameters configured, preconfigured, or predefined by the network side.

For another example, assuming that the threshold T1 corresponds to that the UE selecting a resource is type 1 UE and the UE reserving a resource is type 2 UE. Tn=εn*T1+(αn*G1+βn*G2+γn*G3+δn*G4)+Pn[dbm], where G1 is an antenna gain of the type 1 UE, G2 is an antenna gain of the type 2 UE, G3 is an antenna gain of the UE selecting a resource, G4 is an antenna gain of the UE reserving a resource, and Pn, αn, βn, γn, δn, and εn are parameters configured, preconfigured, or predefined by the network side.

Similarly, the at least one threshold corresponds to a power value, the second parameter information is used to determine a power value of the second terminal, and the first parameter information includes a power value of the first terminal. A threshold corresponding to the power value of the first terminal may be used as the target threshold; or a threshold corresponding to the power value of the second terminal may be used as the target threshold; or a threshold corresponding to a target power value combination may be used as the target threshold, where the target power value combination includes the power value of the first terminal and the power value of the second terminal. The power value is the transmit power, or a product of the antenna gain and the transmit power, or a sum of the antenna gain and the transmit power.

For example, when a unit of the antenna gain and that of the transmit power are dB or dBm, the power value is the sum of the transmit power and the antenna gain. For example, when the power value of the UE selecting a resource is Pa, a corresponding threshold is T1; when the power value of the UE selecting a resource is Pb, a corresponding threshold is T2, and the rest can be deduced by analogy. Alternatively, when the power value of the UE reserving a resource is Pa, a corresponding threshold is T1; when the power value of the UE reserving a resource is Pb, a corresponding threshold is T2, and the rest can be deduced by analogy. Alternatively, when the power value of the UE selecting a resource is Pa and the power value of the UE reserving a resource is Pa, a corresponding threshold is T1; when the power value of the UE selecting a resource is Pa and the power value of the UE reserving a resource is Pb, a corresponding threshold is T2; when the power value of the UE selecting a resource is Pb and the power value of the UE reserving a resource is Pb, a corresponding threshold is T3, and the rest can be deduced by analogy.

Similarly, the at least one threshold corresponds to a power value, the second parameter information is used to determine a power value of the second terminal, and the first parameter information includes a power value of the first terminal. The target threshold is determined based on a threshold in the at least one threshold, a power value corresponding to the threshold, and the power value of the first terminal; or the target threshold is determined based on a threshold in the at least one threshold, a power value corresponding to the threshold, and the power value of the second terminal; or the target threshold is determined based on a threshold in the at least one threshold, a power value corresponding to the threshold, and a target power value combination, where the target power value combination includes the power value of the first terminal and the power value of the second terminal.

Optionally, the first terminal may determine the target threshold based on at least one of the power value, the antenna gain and the terminal type of the first terminal and at least one of the power value, the antenna gain and the terminal type of the second terminal. Therefore, when the second parameter information does not include the power value of the second terminal but includes a link loss or location information, the power value of the second terminal may be determined based on the link loss or the location information, thereby determining the target threshold. For example, when the second terminal uses open-loop power control, the transmit power of the second terminal is related to a link loss between the second terminal and a base station. The second terminal does not directly indicate the transmit power of the second terminal, but includes the link loss in the second parameter information sent by the second terminal, and the transmit power of the second terminal is determined based on the link loss and a preconfigured network configuration parameter: $P_{tx} = \min\{P_{MAX}, 10 \log_{10}(M) + P_0 + \alpha \cdot PL\}$, where PL is the link loss, Pmax is a maximum power configured, preconfigured or predefined by the network side device, M is a bandwidth occupied by a resource in a frequency domain, P0 and α are parameters configured, preconfigured, or predefined by the network side.

For another example, the link loss of the second terminal is related to location information between the second terminal and the base station. Therefore, the UE may not directly indicate the transmit power of the UE, but includes the location information in the second parameter information sent by the UE. The link loss of the second terminal is first determined based on the location information and a preconfigured first network configuration parameter, and then the transmit power of the second terminal is determined based on the link loss and a preconfigured second network configuration parameter. The location information may include a distance between the second terminal and the base station or positioning information of a GPS (Global Positioning System, Global Positioning System) of the second terminal.

Optionally, the target threshold may be determined based on an attribute of a resource detected by the first terminal and the at least one threshold. Further, the at least one threshold corresponds to a resource attribute. A threshold corresponding to the attribute of the resource detected by the first terminal is used as the target threshold; or the target threshold is determined based on a threshold in the at least one threshold, a resource attribute corresponding to the threshold, and the attribute of the resource detected by the first terminal.

For example, in the V2X communication, the network may configure a resource used by a type of terminal, and resources used by different types of terminals for transmission may be the same. When the first terminal performs resource selection and finds, through monitoring, that a resource is reserved by the second terminal, if the resource is a resource used by both the first terminal type and the second terminal type, a threshold T1 is used. Alternatively, if the resource can be used by only the first terminal type, a threshold T2 is used. For another example, when a network configuration resource is a resource that can be used by all of type 1 UE, type 2 UE and type 3 UE for transmission, the type 1 UE uses a threshold T1. When the network configuration resource is a resource that can be used by the type 1 UE and the type 2 UE for transmission, the type 1 UE uses a threshold T2. When the network configuration resource is a resource used by the type 1 UE for transmission, the type 1 UE uses a threshold T3. For another example, the network side device configures a threshold for each configured resource pool, so that the first terminal uses a corresponding threshold based on a resource pool to which the detected resource belongs. For example, it is configured that a threshold corresponding to a resource pool 1 is T1, and a threshold corresponding to a resource pool 2 is T2. When the resource detected by the first terminal belongs to the resource pool 1, the threshold T1 is used. When the resource detected by the first terminal belongs to the resource pool 2, the threshold T2 is used.

Optionally, the target threshold is determined based on a congestion degree of a channel or a carrier and the at least one threshold. Further, the at least one threshold corresponds to a congestion degree; and a threshold corresponding to the congestion degree of the channel or the carrier may be used as the target threshold; or the target threshold may be determined based on a threshold in the at least one threshold, a congestion degree corresponding to the threshold, and the congestion degree of the channel or the carrier.

For example, for a specific quantity of resources, a greater transmission amount of the UE indicates a higher congestion degree of the network. Congestion control may be used in the V2X communication. The UE reduces a transmit power when congestion occurs, and a threshold used by the first terminal to determine whether a reserved resource should be excluded is also changed with the change of the transmit power. The network configures a threshold T1 and a threshold T2 that respectively correspond to a congestion degree L1 and a congestion degree L2, and the UE selects a corresponding threshold based on a congestion degree of a current channel or carrier. When the congestion degree is L1, the threshold used by the first terminal is T1. When the congestion degree is L2, the threshold used by the UE is T2. For another example, the network configures that the threshold corresponding to the congestion degree L1 is T1[dbm], and that when the congestion degree is Ln, the corresponding threshold is T1+Xn[dbm]. The UE can determine the corresponding threshold based on the congestion degree of the current channel or carrier and T1.

Optionally, the target threshold may be determined based on a priority of a data transport block. Specifically, data transport blocks are distinguished by priorities, and a data transport block having a higher priority may preferentially use a resource. Priority information of a data transport block may be indicated in SA. Therefore, in addition to determining the target threshold based on the factors in the foregoing embodiments, the first terminal may further determine the target threshold by also referring to a priority of a data transport block.

For example, when determining the target threshold by using the terminal type, as described above, the network configures that when the UE selecting a resource is V-UE and the UE reserving a resource is V-UE, corresponding thresholds are T11, T12, T13 and T14; when the UE selecting a resource is V-UE and the UE reserving a resource is P-UE, corresponding thresholds are T21, T22, T23 and T24; when the UE selecting a resource is P-UE and the UE reserving a resource is P-UE, corresponding thresholds are T31, T32, T33 and T34, and the rest can be deduced by analogy. When the UE selecting a resource is V-UE and the UE reserving a resource is P-UE, the corresponding thresholds T21, T22, T23 and T24 are determined first, and then a corresponding threshold is selected from the thresholds T21, T22, T23 and T24 based on a priority of a data transport block. Another method of determining the target threshold is similar to this method.

After the target threshold is determined by using the foregoing method, when a receive power of a reference signal of a physical sidelink shared channel is less than the receive power threshold, the UE may select the resource to send data, that is, multiplex the resource reserved by the second terminal; when the receive power of the reference signal of the physical sidelink shared channel is not less than the receive power threshold, because the first terminal and the second terminal may be mutually interfered if using the same resource at the same time, the UE cannot multiplex the resource.

In this embodiment of the present invention, the first terminal first determines at least one of second parameter information of the second terminal and configuration information; and then determines the target threshold based on at least one of the configuration information, the second parameter information, and first parameter information of the first terminal, and finally performs the resource selection based on the target threshold. A resource is selected by changing the target threshold based on different parameters. In this way, a signal-to-interference ratio is increased, an error rate is reduced, and a demodulation performance is improved.

Figure 6:
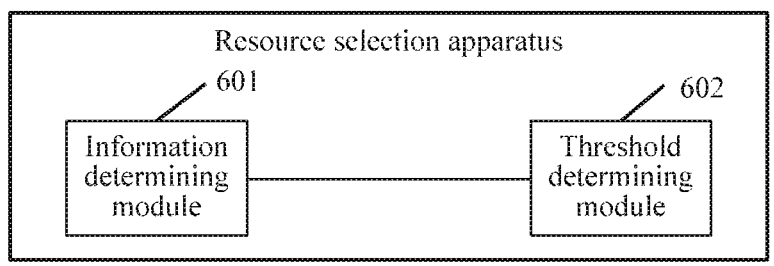
FIG. 6 is a schematic structural diagram of a resource selection apparatus according to an embodiment of the present invention.

FIG. 6 is a schematic structural diagram of a resource selection apparatus according to an embodiment of the present invention. As shown in the figure, the apparatus in this embodiment of the present invention includes an information determining module 601 and a threshold determining module 602.

The information determining module 601 is configured to determine at least one of second parameter information of a second terminal and configuration information.

During specific implementation, the second parameter information is used to determine at least one of a terminal type, a power value, location information, an antenna gain, and a link loss of the second terminal, and the first parameter information includes at least one of a terminal type, a power value, location information, an antenna gain, and a link loss of the first terminal. The first terminal is UE selecting a resource, and the second terminal is UE reserving a resource. In V2X communication, the second terminal needs to inform another terminal that the second terminal reserves a future resource and sends the second parameter information to the another terminal. The first terminal, when selecting a resource, receives the second parameter information sent by the second terminal, so that the second parameter information of the second terminal is obtained. The configuration information is configured, preconfigured, or predefined by a network side device, and the configuration information includes at least one threshold.

The threshold determining module 602 is configured to determine a target threshold based on at least one of the configuration information, the second parameter information, and the first parameter information of the first terminal, where the target threshold is used by the first terminal to perform resource selection.

During specific implementation, the at least one threshold corresponds to a terminal type, the second parameter information is used to determine a terminal type of the second terminal, and the first parameter information includes a terminal type of the first terminal. A threshold corresponding to the terminal type of the first terminal may be used as the target threshold; or a threshold corresponding to the terminal type of the second terminal may be used as the target threshold; or a threshold corresponding to a target terminal type combination may be used as the target threshold, where the target terminal type combination includes the terminal type of the first terminal and the terminal type of the second terminal.

For example, if open-loop power control is not used, the transmit power and the antenna gain of each UE are fixed, and the network configures different thresholds for different terminal types or different terminal type combinations. The UE selecting a resource selects a corresponding threshold based on a type of the UE and/or a type of the UE reserving a resource. For example, when the UE selecting a resource is V-UE, a corresponding threshold is T1. When the UE selecting a resource is P-UE, a corresponding threshold is T2, and the rest can be deduced by analogy. Alternatively, when the UE reserving a resource is V-UE, a corresponding threshold is T1. When the UE reserving a resource is P-UE, a corresponding threshold is T2, and the rest can be deduced by analogy. Alternatively, when the UE selecting a resource is V-UE, and the UE reserving a resource is V-UE, a corresponding threshold is T1. When the UE selecting a resource is V-UE, and the UE reserving a resource is P-UE, a corresponding threshold is T2. When the UE selecting a resource is P-UE, and the UE reserving a resource is P-UE, a corresponding threshold is T3, and the rest can be deduced by analogy. V-UE is vehicle (vehicle)-type UE, and P-UE is pedestrian (pedestrian)-type UE.

Optionally, the at least one threshold corresponds to a terminal type, the second parameter information is used to determine a terminal type of the second terminal, and the first parameter information includes a terminal type of the first terminal. The target threshold may be determined based on a threshold in the at least one threshold, a power value corresponding to the threshold, and a power value of the first terminal; or the target threshold may be determined based on a threshold in the at least one threshold, a power value corresponding to the threshold, and a power value of the second terminal; or the target threshold may be determined based on a threshold in the at least one threshold, a power value corresponding to the threshold, and a target power value combination, where the target power value combination includes the power value of the first terminal and the power value of the second terminal.

For example, the configuration information includes a threshold T1, and a combination corresponding to the threshold T1 is that the UE selecting a resource is V-UE and the UE reserving a resource is V-UE, or that the UE selecting a resource is V-UE and the UE reserving a resource is P-UE, or another type of combination. The configuration information does not include a corresponding threshold, but the network configures a relationship between a threshold corresponding to another terminal type and the threshold T1. The threshold corresponding to the another terminal type may be calculated based on the threshold T1 and the relationship between the threshold corresponding to the another terminal type and the threshold T1. It is assumed that the threshold T1 is the threshold corresponding to the target terminal type combination, and Tn is a to-be-determined threshold corresponding to the another terminal type. The network configures that when the UE selecting a resource is V-UE and the UE reserving a resource is V-UE, a corresponding threshold is T1; when the UE selecting a resource is V-UE and the UE reserving a resource is P-UE, a corresponding threshold is $T2=T1+P2[dbm]$; when the UE selecting a resource is P-UE and the UE reserving a resource is P-UE, a corresponding threshold is $T3=T1+P3[dbm]$; when the UE selecting a resource is P-UE and the UE reserving a resource is V-UE, a corresponding threshold is $T4=T+P4[dbm]$, where P2, P3, and P4 are parameters configured, preconfigured, or predefined by the network side.

For another example, assuming that the threshold T1 corresponds to that the UE selecting a resource is type 1 UE and the UE reserving a resource is type 2 UE, $Tn=\epsilon n*T1+(\alpha n*Ptx1+\beta n*Ptx2+\gamma n*Ptx3+\delta n*Ptx4)+Pn[dbm]$, where Ptx1 is a transmit power of the type 1 UE, Ptx2 is a transmit power of the type 2 UE, Ptx3 is a transmit power of the UE selecting a resource, Ptx4 is a transmit power of the UE reserving a resource, and Pn, αn, βn, γn, δn, and εn are parameters configured, preconfigured, or predefined by the network side.

For another example, assuming that the threshold T1 corresponds to that the UE selecting a resource is type 1 UE and the UE reserving a resource is type 2 UE. $Tn=\epsilon n*T1+(\alpha n*G1+\beta n*G2+\gamma n*G3+\delta n*G4)+Pn[dbm]$, where G1 is an antenna gain of the type 1 UE, G2 is an antenna gain of the type 2 UE, G3 is an antenna gain of the UE selecting a resource, G4 is an antenna gain of the UE reserving a resource, and Pn, αn, βn, γn, δn, and εn are parameters configured, preconfigured, or predefined by the network side.

Similarly, the at least one threshold corresponds to a power value, the second parameter information is used to determine a power value of the second terminal, and the first parameter information includes a power value of the first terminal. A threshold corresponding to the power value of the first terminal may be used as the target threshold; or a threshold corresponding to the power value of the second terminal may be used as the target threshold; or a threshold corresponding to a target power value combination may be used as the target threshold, where the target power value combination includes the power value of the first terminal and the power value of the second terminal. The power value is the transmit power, or a product of the antenna gain and the transmit power, or a sum of the antenna gain and the transmit power.

For example, when a unit of the antenna gain and that of the transmit power are dB or dBm, the power value is the sum of the transmit power and the antenna gain. For example, when the power value of the UE selecting a resource is Pa, a corresponding threshold is T1; when the power value of the UE selecting a resource is Pb, a corresponding threshold is T2, and the rest can be deduced by analogy. Alternatively, when the power value of the UE reserving a resource is Pa, a corresponding threshold is T1; when the power value of the UE reserving a resource is Pb, a corresponding threshold is T2, and the rest can be deduced by analogy. Alternatively, when the power value of the UE selecting a resource is Pa and the power value of the UE reserving a resource is Pa, a corresponding threshold is T1; when the power value of the UE selecting a resource is Pa and the power value of the UE reserving a resource is Pb, a corresponding threshold is T2; when the power value of the UE selecting a resource is Pb and the power value of the UE reserving a resource is Pb, a corresponding threshold is T3, and the rest can be deduced by analogy.

Similarly, the at least one threshold corresponds to a power value, the second parameter information is used to determine a power value of the second terminal, and the first parameter information includes a power value of the first terminal. The target threshold is determined based on a threshold in the at least one threshold, a power value corresponding to the threshold, and the power value of the first terminal; or the target threshold is determined based on a threshold in the at least one threshold, a power value corresponding to the threshold, and the power value of the second terminal; or the target threshold is determined based on a threshold in the at least one threshold, a power value corresponding to the threshold, and a target power value combination, where the target power value combination includes the power value of the first terminal and the power value of the second terminal.

Optionally, the first terminal may determine the target threshold based on at least one of the power value, the antenna gain and the terminal type of the first terminal and at least one of the power value, the antenna gain and the terminal type of the second terminal. Therefore, when the second parameter information does not include the power value of the second terminal but includes the link loss or the location information, the power value of the second terminal may be determined based on a link loss or location information, thereby determining the target threshold. For example, when the second terminal uses open-loop power control, the transmit power of the second terminal is related to a link loss between the second terminal and a base station. The second terminal does not directly indicate the transmit power of the second terminal, but includes the link loss in the second parameter information sent by the second terminal, and the transmit power of the second terminal is determined based on the link loss and a preconfigured network configuration parameter: $P_{tx}=\min\{P_{MAX}, 10\log_{10}(M)+P_0+\alpha \cdot PL\}$, where PL is the link loss, Pmax is a maximum power configured, preconfigured or predefined by the network side device, M is a bandwidth occupied by a resource in a frequency domain, P0 and α are parameters configured, preconfigured, or predefined by the network side.

For another example, the link loss of the second terminal is related to location information between the second terminal and the base station. Therefore, the UE may not directly indicate the transmit power of the UE, but includes the location information in the second parameter information sent by the UE. The link loss of the second terminal is first determined based on the location information and a preconfigured first network configuration parameter, and then the transmit power of the second terminal is determined based on the link loss and a preconfigured second network configuration parameter. The location information may include a distance between the second terminal and the base station or positioning information of a GPS (Global Positioning System, Global Positioning System) of the second terminal.

Optionally, the target threshold may be determined based on an attribute of a resource detected by the first terminal and the at least one threshold. Further, the at least one threshold corresponds to a resource attribute. A threshold corresponding to the attribute of the resource detected by the first terminal may be used as the target threshold; or the target threshold may be determined based on a threshold in the at least one threshold, a resource attribute corresponding to the threshold, and the attribute of the resource detected by the first terminal.

For example, in the V2X communication, the network may configure a resource used by a type of terminal, and resources used by different types of terminals for transmission may be the same. When the first terminal performs resource selection and finds, through monitoring, that a resource is reserved by the second terminal, if the resource is a resource used by both the first terminal type and the second terminal type, a threshold T1 is used. Alternatively, if the resource can be used by only the first terminal type, a threshold T2 is used. For another example, when a network configuration resource is a resource that can be used by all of type 1 UE, type 2 UE and type 3 UE for transmission, the type 1 UE uses a threshold T1. When the network configuration resource is a resource that can be used by the type 1 UE and the type 2 UE for transmission, the type 1 UE uses a threshold T2. When the network configuration resource is a resource used by the type 1 UE for transmission, the type 1 UE uses a threshold T3. For another example, the network side device configures a threshold for each configured resource pool, so that the first terminal uses a corresponding threshold based on a resource pool to which the detected resource belongs. For example, it is configured that a threshold corresponding to a resource pool 1 is T1, and a threshold corresponding to a resource pool 2 is T2. When the resource detected by the first terminal belongs to the resource pool 1, the threshold T1 is used. When the resource detected by the first terminal belongs to the resource pool 2, the threshold T2 is used.

Optionally, the target threshold is determined based on a congestion degree of a channel or a carrier and the at least one threshold. Further, the at least one threshold corresponds to a congestion degree; and a threshold corresponding to the congestion degree of the channel or the carrier may be used as the target threshold; or the target threshold may be determined based on a threshold in the at least one threshold, a congestion degree corresponding to the threshold, and the congestion degree of the channel or the carrier.

For example, for a specific quantity of resources, a greater transmission amount of the UE indicates a higher congestion degree of the network. Congestion control may be used in the V2X communication. The UE reduces a transmit power when congestion occurs, and a threshold used by the first terminal to determine whether a reserved resource should be excluded is also changed with the change of the transmit power. For example, the network configures a threshold T1 and a threshold T2 that respectively correspond to a congestion degree L1 and a congestion degree L2, and the UE selects a corresponding threshold based on a congestion degree of a current channel or carrier. When the congestion degree is L1, the threshold used by the first terminal is T1. When the congestion degree is L2, the threshold used by the UE is T2. For another example, the network configures that the threshold corresponding to the congestion degree L1 is T1[dbm], and that when the congestion degree is Ln, the corresponding threshold is T1+Xn[dbm]. The UE can determine the corresponding threshold based on the congestion degree of the current channel or carrier and T1.

Optionally, the target threshold may be determined based on a priority of a data transport block. Specifically, data transport blocks are distinguished by priorities, and a data transport block having a higher priority may preferentially use a resource. Priority information of a data transport block may be indicated in SA. Therefore, in addition to determining the target threshold based on the factors in the foregoing embodiments, the first terminal may further determine the target threshold by also referring to a priority of a data transport block.

For example, when determining the target threshold by using the terminal type, as described above, the network configures that when the UE selecting a resource is V-UE and the UE reserving a resource is V-UE, corresponding thresholds are T11, T12, T13 and T14; when the UE selecting a resource is V-UE and the UE reserving a resource is P-UE, corresponding thresholds are T21, T22, T23 and T24; when the UE selecting a resource is P-UE and the UE reserving a resource is P-UE, corresponding thresholds are T31, T32, T33 and T34, and the rest can be deduced by analogy. When the UE selecting a resource is V-UE and the UE reserving a resource is P-UE, the corresponding thresholds T21, T22, T23 and T24 are determined first, and then a corresponding threshold is selected from the thresholds T21, T22, T23 and T24 based on a priority of a data transport block. Another method of determining the target threshold is similar to this method.

After the target threshold is determined by using the foregoing method, when a receive power of a reference signal of a physical sidelink shared channel is less than the receive power threshold, the UE may select the resource to send data, that is, multiplex the resource reserved by the second terminal; when the receive power of the reference signal of the physical sidelink shared channel is not less than the receive power threshold, because the first terminal and the second terminal may be mutually interfered if using the same resource at the same time, the UE cannot multiplex the resource.

In this embodiment of the present invention, the first terminal first determines at least one of the second parameter information of the second terminal and the configuration information; and then determines the target threshold based on at least one of the configuration information, the second parameter information, and the first parameter information of the first terminal, and finally performs the resource selection based on the target threshold. A resource is selected by changing a target threshold based on different parameters. In this way, a signal-to-interference ratio is increased, an error rate is reduced, and a demodulation performance is improved.

Figure 7:
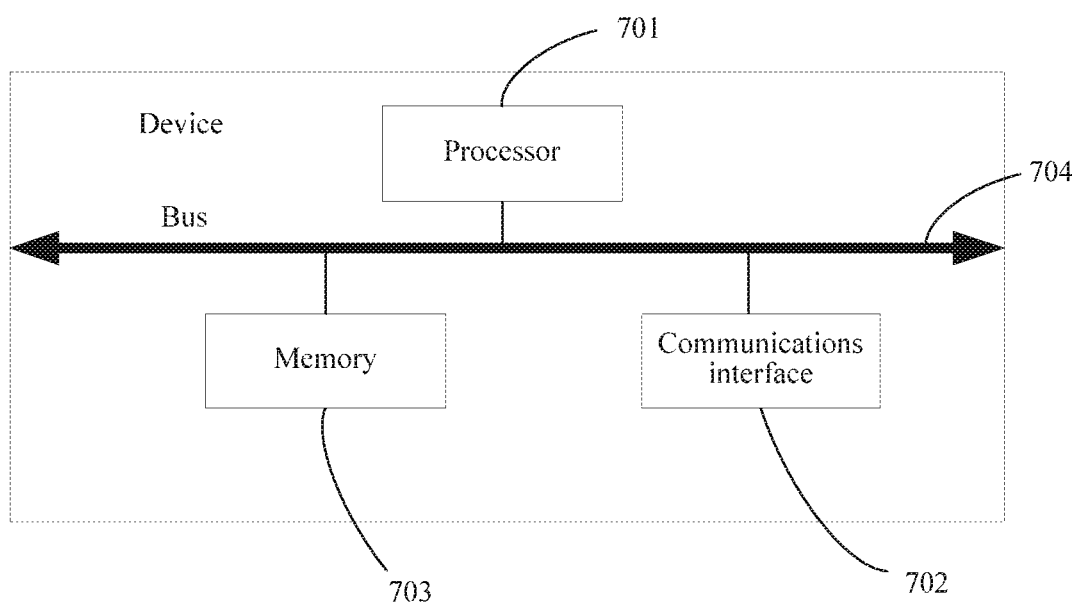
FIG. 7 is a schematic structural diagram of a resource multiplexing device according to an embodiment of the present invention.

Further, FIG. 7 is a schematic structural diagram of a resource multiplexing device according to the present invention. As shown in the figure, the device may include: at least one processor 701, for example, a CPU, at least one communications interface 702, at least one memory 703, and at least one communications bus 704. The communications bus 704 is configured to implement connection and communication between the components. The communications interface 702 in the device of this embodiment of the present invention is configured to perform signaling or data communication with another node device. The memory 703 may be a high-speed RAM memory, or may be a non-volatile memory (non-volatile memory), for example, at least one magnetic disk memory. Optionally, the memory 703 may further be at least one storage apparatus that is located far away from the processor 701. The memory 703 stores a group of program code, and the processor 701 performs programs stored in the memory 703 to perform the method performed by the foregoing resource multiplexing apparatus or implement the function implemented by the foregoing resource multiplexing apparatus.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are preferred embodiments, and the related actions and modules are not necessarily mandatory to the present invention.

In the foregoing embodiments, the descriptions of the embodiments have respective focuses. For a part that is not described in detail in an embodiment, reference may be made to related descriptions in other embodiments.

A person of ordinary skill in the art may understand that all or a part of the steps of the methods in the embodiments may be implemented by a program instructing relevant hardware. The program may be stored in a computer readable storage medium. The storage medium may include a flash memory, a read-only memory (Read-Only Memory, ROM), a random access memory (Random Access Memory, RAM), a magnetic disk, or an optical disk.

The foregoing describes in detail the content download method, the related device, and the system that are provided in the embodiments of the present invention. In this specification, specific examples are used to describe the principle and implementations of the present invention, and the description of the embodiments is only intended to help understand the method and core idea of the present invention. Meanwhile, a person of ordinary skill in the art may, based on the idea of the present invention, make modifications with respect to the specific implementations and the application scope. Therefore, the content of this specification shall not be construed as a limitation to the present invention

What is claimed is:

1. A device, comprising:
a non-transitory memory;
a communications bus; and
a processor, wherein the memory stores a program to be executed by the processor, the program including instructions for:
  determining second parameter information of a second terminal or configuration information, wherein the second parameter information of the second terminal defines a terminal type of the second terminal, a power value of the second terminal, location information of the second terminal, an antenna gain of the second terminal, or a link loss of the second terminal; and
  determining a target threshold according to the configuration information, the second parameter information of the second terminal, or first parameter information of a first terminal, wherein the first terminal selects a time-frequency resource to use to perform device-to-device (D2D) communication with the second terminal according to the target threshold, and the first parameter information of the first terminal comprises a terminal type of the first terminal, a power value of the first terminal, location information of the first terminal, an antenna gain of the first terminal, or a link loss of the first terminal;
wherein the configuration information is set by a network side device on the device; and
wherein the configuration information comprises at least one threshold.

2. The device according to claim 1, wherein the at least one threshold corresponds to a terminal type, the second parameter information defines the terminal type of the second terminal, and the first parameter information comprises the terminal type of the first terminal; and
the instructions comprise further instructions for:
  using a threshold corresponding to the terminal type of the first terminal as the target threshold;
  using a threshold corresponding to the terminal type of the second terminal as the target threshold; or
  using a threshold corresponding to a target terminal type combination as the target threshold, wherein the target terminal type combination comprises the terminal type of the first terminal and the terminal type of the second terminal.

3. The device according to claim 1, wherein the at least one threshold corresponds to a terminal type, the second parameter information defines the terminal type of the second terminal, and the first parameter information comprises the terminal type of the first terminal; and
the instructions comprise further instructions for:
  determining the target threshold according to a threshold in the at least one threshold, a terminal type corresponding to the threshold in the at least one threshold, and the terminal type of the first terminal;
  determining the target threshold according to a threshold in the at least one threshold, a terminal type corresponding to the threshold in the at least one threshold, and the terminal type of the second terminal; or determining the target threshold according to a threshold in the at least one threshold, a terminal type corresponding to the threshold in the at least one threshold, and a target terminal type combination, wherein the target terminal type combination comprises the terminal type of the first terminal and the terminal type of the second terminal.

4. The device according to claim 1, wherein the at least one threshold corresponds to a power value, the second parameter information defines the power value of the second terminal, and the first parameter information comprises the power value of the first terminal; and the instructions comprise further instructions for:
using a threshold corresponding to the power value of the first terminal as the target threshold;
using a threshold corresponding to the power value of the second terminal as the target threshold; or
using a threshold corresponding to a target power value combination as the target threshold, wherein the target power value combination comprises the power value of the first terminal and the power value of the second terminal.

5. The device according to claim 1, wherein the at least one threshold corresponds to a power value, the second parameter information defines the power value of the second terminal, and the first parameter information comprises the power value of the first terminal; and the instructions comprise further instructions for:
determining the target threshold according to a threshold in the at least one threshold, a power value corresponding to the threshold in the at least one threshold, and the power value of the first terminal;
determining the target threshold according to a threshold in the at least one threshold, a power value corresponding to the threshold in the at least one threshold, and the power value of the second terminal; or
determining the target threshold according to a threshold in the at least one threshold, a power value corresponding to the threshold in the at least one threshold, and a target power value combination, wherein the target power value combination comprises the power value of the first terminal and the power value of the second terminal.

6. The device according to claim 5, wherein the second parameter information defines the power value of the second terminal according to the link loss of the second terminal or location information of the second terminal.

7. The device according to claim 1, wherein the instructions comprise further instructions for:
determining the target threshold according to the at least one threshold and an attribute of a resource detected by the first terminal.

8. The device according to claim 7, wherein the at least one threshold corresponds to a resource attribute; and the instructions comprise further instructions for:
using a threshold corresponding to the attribute of the resource detected by the first terminal as the target threshold; or
determining the target threshold according to a threshold in the at least one threshold, a resource attribute corresponding to the threshold in the at least one threshold, and the attribute of the resource detected by the first terminal.

9. The device according to claim 1, wherein the instructions comprise further instructions for:

determining the target threshold according to a congestion degree of a channel and the at least one threshold; or
determining the target threshold according to a congestion degree of a carrier and the at least one threshold.

10. The device according to claim 1, wherein the instructions comprise further instructions for:
determining the target threshold according to a priority of a data transport block.

11. The device according to claim 6, wherein the location information of the second terminal includes a distance between the second terminal and a base station or positioning information of a Global Positioning System (GPS) of the second terminal.

12. The device according to claim 9, wherein the at least one threshold corresponds to a congestion degree; and the instructions comprise further instructions for:
using a threshold corresponding to the congestion degree of the channel or the congestion degree of the carrier as the target threshold;
determining the target threshold according to a threshold in the at least one threshold, a congestion degree corresponding to the threshold in the at least one threshold, and the congestion degree of the channel; or
determining the target threshold according to the threshold in the at least one threshold, a congestion degree corresponding to the threshold in the at least one threshold, and the congestion degree of the carrier.

13. A method, comprising:
determining, by a first terminal, second parameter information of a second terminal or configuration information, wherein the second parameter information defines a terminal type of the second terminal, a power value of the second terminal, location information of the second terminal, an antenna gain of the second terminal, or a link loss of the second terminal; and
determining, by the first terminal, a target threshold according to the configuration information, the second parameter information of the second terminal, or first parameter information of the first terminal, wherein the first terminal selects a time-frequency resource to use to perform device-to-device (D2D) communication with the second terminal according to the target threshold, and the first parameter information of the first terminal comprises a terminal type of the first terminal, a power value of the first terminal, location information of the first terminal, an antenna gain of the first terminal, or a link loss of the first terminal;
wherein the configuration information is set by a network side device on the first terminal; and
wherein the configuration information comprises at least one threshold.

14. The method according to claim 13, wherein the at least one threshold corresponds to a terminal type, the second parameter information defines the terminal type of the second terminal, and the first parameter information comprises the terminal type of the first terminal; and determining the target threshold according to the configuration information, the second parameter information of the second terminal, or the first parameter information of the first terminal comprises:
using a threshold corresponding to the terminal type of the first terminal as the target threshold;
using a threshold corresponding to the terminal type of the second terminal as the target threshold; or using a threshold corresponding to a target terminal type combination as the target threshold, wherein the target terminal type combination comprises the terminal type of the first terminal and the terminal type of the second terminal.

15. The method according to claim 13, wherein the at least one threshold corresponds to a terminal type, the second parameter information defines the terminal type of the second terminal, and the first parameter information comprises the terminal type of the first terminal; and determining the target threshold according to the configuration information, the second parameter information, or the first parameter information of the first terminal comprises:

determining the target threshold according to a threshold in the at least one threshold, a terminal type corresponding to the threshold in the at least one threshold, and the terminal type of the first terminal;

determining the target threshold according to a threshold in the at least one threshold, a terminal type corresponding to the threshold in the at least one threshold, and the terminal type of the second terminal; or determining the target threshold according to a threshold in the at least one threshold, a terminal type corresponding to the threshold in the at least one threshold, and a target terminal type combination, wherein the target terminal type combination comprises the terminal type of the first terminal and the terminal type of the second terminal.

16. The method according to claim 13, wherein the at least one threshold corresponds to a power value, the second parameter information defines the power value of the second terminal, and the first parameter information comprises the power value of the first terminal; and determining the target threshold according to the configuration information, the second parameter information, or the first parameter information of the first terminal comprises:

using a threshold corresponding to the power value of the first terminal as the target threshold;

using a threshold corresponding to the power value of the second terminal as the target threshold; or using a threshold corresponding to a target power value combination as the target threshold, wherein the target power value combination comprises the power value of the first terminal and the power value of the second terminal.

17. The method according to claim 13, wherein the at least one threshold corresponds to a power value, the second parameter information defines the power value of the second terminal, and the first parameter information comprises the power value of the first terminal; and determining the target threshold according to the configuration information, the second parameter information, or the first parameter information of the first terminal comprises:

determining the target threshold according to a threshold in the at least one threshold, a power value corresponding to the threshold in the at least one threshold, and the power value of the first terminal;

determining the target threshold according to a threshold in the at least one threshold, a power value corresponding to the threshold in the at least one threshold, and the power value of the second terminal; or determining the target threshold according to a threshold in the at least one threshold, a power value corresponding to the threshold in the at least one threshold, and a target power value combination, wherein the target power value combination comprises the power value of the first terminal and the power value of the second terminal.

18. The method according to claim 17, wherein the second parameter information defines the power value of the second terminal according to a link loss of the second terminal or location information of the second terminal.

19. The method according to claim 13, wherein determining the target threshold according to the configuration information, the second parameter information, or the first parameter information comprises:

determining the target threshold according to an attribute of a resource detected by the first terminal and the at least one threshold.

20. The method according to claim 18, wherein the location information of the second terminal includes a distance between the second terminal and a base station or positioning information of a Global Positioning System (GPS) of the second terminal.

* * * * *